Jan. 5, 1960   H. B. KLEVENS ET AL   2,919,998
COLLAGEN ARTICLE AND THE MANUFACTURE THEREOF
Filed Nov. 7, 1957   5 Sheets-Sheet 2

INVENTORS
HOWARD B. KLEVENS
JOSEPH NICHOLS
BY Robert W. Kell
ATTORNEY

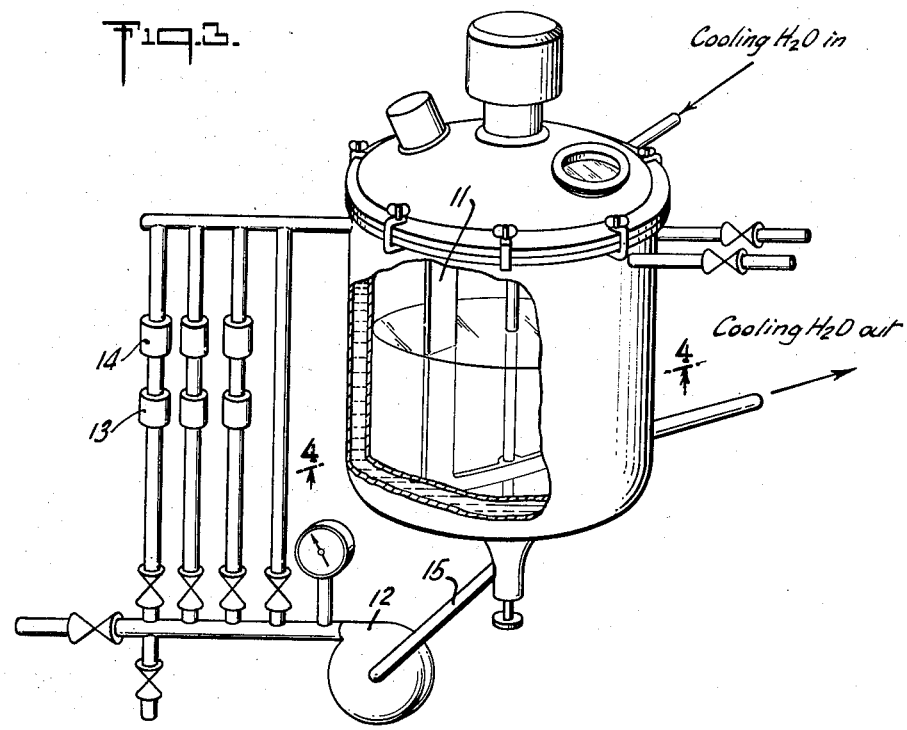
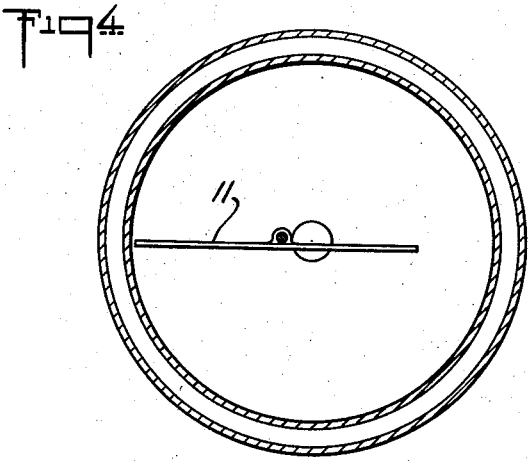

Jan. 5, 1960  H. B. KLEVENS ET AL  2,919,998
COLLAGEN ARTICLE AND THE MANUFACTURE THEREOF
Filed Nov. 7, 1957  5 Sheets-Sheet 5

INVENTORS
HOWARD B. KLEVENS
JOSEPH NICHOLS
BY Robert W. Kell
ATTORNEY

United States Patent Office 2,919,998
Patented Jan. 5, 1960

2,919,998

COLLAGEN ARTICLE AND THE MANUFACTURE THEREOF

Howard B. Klevens, Pittsburgh, Pa., and Joseph Nichols, Princeton, N.J., assignors to Ethicon, Inc., a corporation of New Jersey Application November 7, 1957, Serial No. 695,151

5 Claims. (Cl. 106—161)

This invention relates to a dispersion of swollen collagen fibers in an acid solution and to a process for obtaining such a dispersion. The collagen dispersions of the present invention are useful in the manufacture of absorbable sutures and surgical aids in the form of films, filaments, tubing and sponges. Edible sausage casings have also been made from these collagen dispersions.

The success of a process employing collagen as a basic material is often dependent upon maintaining the original collagen structure throughout the process. Denaturation or degradation of the collagen structure prior to or during the casting of a film, spinning of a fiber, or extrusion of a shaped article such as a ribbon or a tube, will impair desirable qualities of the fabricated article. Prevention of serious degradation during processing, however, has always been difficult because collagen in the native state is associated with impurities and must be separated therefrom. It has been a disadvantage of the prior art processes for the manufacture of a collagen dispersion that serious denaturation and degradation of the collagen results from the mechanical, thermal and chemical steps employed to separate the collagen from associated non-collagenous impurities.

It is an object of the present invention to separate collagen from connective tissue without changing the original collagen structure.

Another object of this invention is to prepare a homogeneous dispersion of swollen undenatured and undegraded collagen fibers.

Yet another object of this invention is to prepare a dispersion of collagen that may be extruded into a coagulating bath to form shaped articles of exceptional strength.

The objects of this invention may be realized through the use of a perfluoro acid, or a mixture of perfluoro acids, in aqueous solution, as a swelling and dispersing agent for the collagen. One phase of the present invention relates to the protection of the collagen given by the addition of a perfluoro acid to the protein molecule. The addition compound formed between the collagen molecule and perfluoro acid is significantly more resistant to the forces causing molecular degradation than the collagen molecule alone. Protection of the collagen is thus obtained during processing. After processing, removal of the perfluoro acid can be effected by washing the shaped protein article with an alcohol or water.

The invention will appear more clearly from the following detailed description when taken in connection with the accompanying drawings, showing, by way of example, a preferred embodiment of the inventive idea. Referring now to the drawings:

Figure 3 is a sectional view of a dispersion kettle and illustrates the associated circulating pump and homogenizing jets.

Figure 4 is a sectional view of the dispersion kettle along the line 4—4 of Figure 3.

Figure 1:
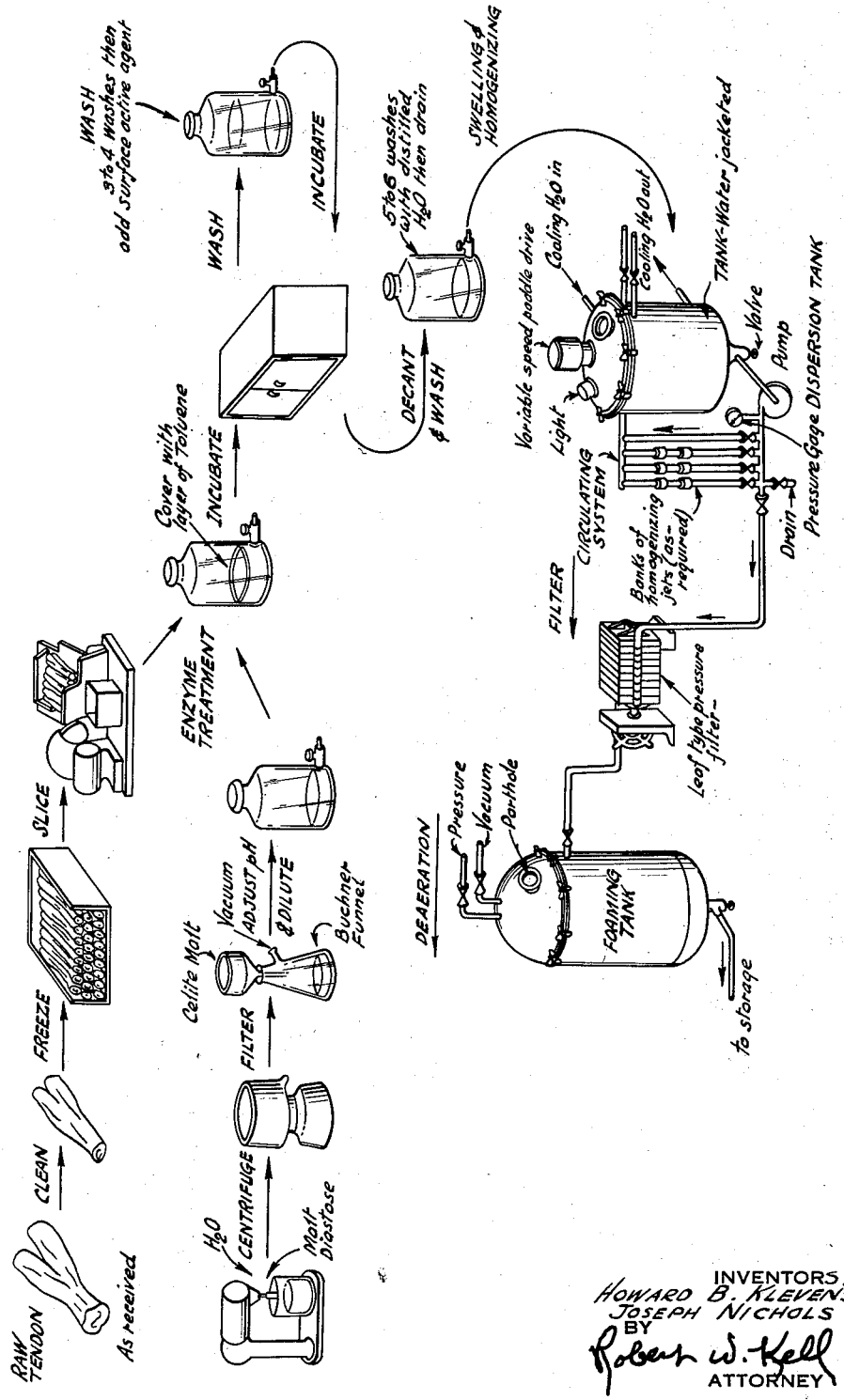
Figure 1 is a flow diagram illustrating the sequence of steps in preparing a dispersion of collagen fibers from animal tendon.

The general sequence of operations in the formation of a dispersion of pure collagen fibers is shown by the flow sheet appearing as Figure 1 in the accompanying drawings. By the process to be described, one may disperse the collagen fibers and remove impurities therefrom without appreciable denaturation or degradation of the collagen structure.

The raw material for the dispersion of this invention is mammalian tendon. Whales are a large source of collagen and whale tendon is a satisfactory starting material. Pork, sheep and beef tendons are also satisfactory. The best results to date have been obtained using the deep flexor tendon of cattle.

Figure 2:
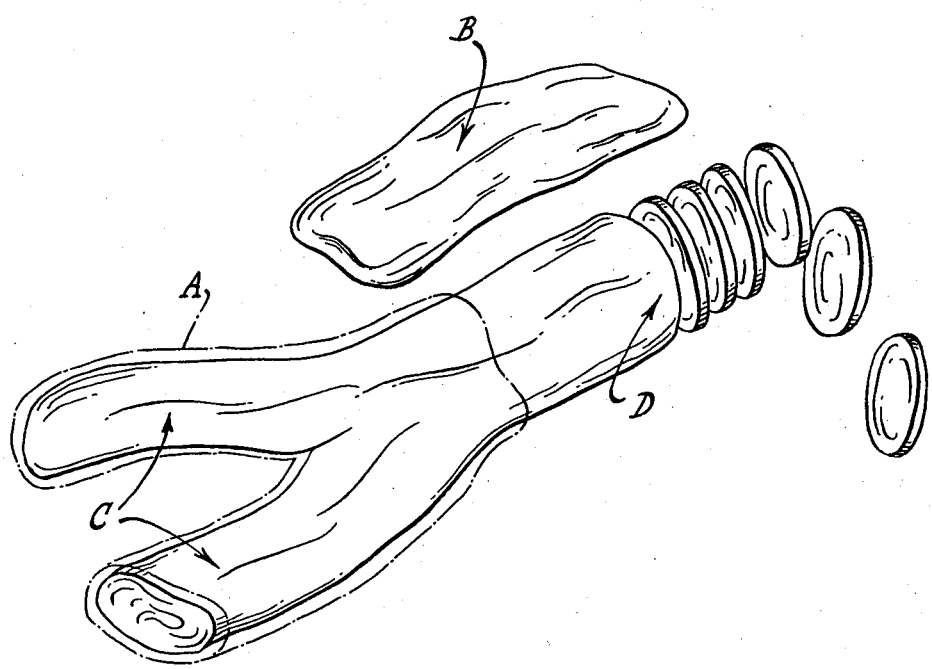
Figure 2 is a drawing of the superficial flexor and deep flexor tendons as obtained from cattle and illustrates that portion of the tendon used in preparing the dispersion of the present invention.

The various sections of bovine tendon are illustrated in Figure 2. In this figure certain sections of the tendon have been arbitrarily designated by the letters "A" through "D." The "A" portions consist of sheaths (annular ligaments) which surround the two "C" sections. The "A" portions are also connected directly to the "B" tendon (the superficial flexor tendon). The "C" material consists of two small dense shanks which branch off the larger "D" section. These "C" portions (branches of the deep flexor tendon) contain a large percentage of reticulin. That section of the single shank identified by the letter "D" in Figure 2 (the deep flexor tendon) is the preferred portion of the tendon for preparing the collagen dispersion to be described, but the "B" portion may also be used.

The beef tendons, as shipped from the packing house and received, are frozen to prevent deterioration and must be thawed in order to clean the tendon of fat, protein, and other extraneous matter. The clean tendons are then sliced to a thickness of about 15 to 30 mils. Thicker slices swell slowly in aqueous perfluoro acid solutions and are difficult to disperse. Thinner slices disperse readily but the dispersion when extruded has poor tensile strength. Preferably, the tendon sections are sliced across the major axis as lengthwise slicing seems to result in a slower swelling. An aliquot sample of the sliced tendon is analyzed at this time for total solids as the moisture contained in the tendon received from various suppliers at different times is not constant.

The sliced tendon is next treated with an enzyme solution to dissolve the elastin which encircles and ties together the collagen fibers. By this treatment substantially all of the elastin is dissolved and can be removed. Proteolytic enzymes from either plant or animal sources may be employed to advantage. Pancreatin is an enzyme that is effective in removing elastin. Enzymes derived from plants, such as ficin, are also useful. Another enzyme that will perform this function is one prepared by extracting commercial malt diastase (U.S.P. IX) with water. The tendon-enzyme mixture is incubated at a temperature of about 35° to 40° C. for 15 to 20 hours.

After incubation, the tendon slices are washed with water. Soluble proteins and lipids may be removed by washing the slices with a dilute aqueous solution of a chelating agent such as ethylenediamine tetrasodium acetate. Following this treatment, the tendon slices should be washed again to remove residual traces of any chelating agent.

The cleaned tendon slices at this point contain a high percentage of purified collagen and most of the reticulin that was present in the original tendon. The next step is to swell this collagen in a perfluoro acid solution to form a homogeneous dispersion of collagen fibers, but it is most important during this swelling step that the individual slices of collagen not be permitted to coalesce. As collagen swells, it becomes sticky and, if the individual collagen slices are permitted to stick together, the interior of the conglomeration does not have contact with the swelling solution. Therefore, to obtain a homogeneous fiber dispersion in a practical time, it is absolutely necessary to prevent coalescence of the individual tendon slices. A dispersion kettle (see Figures 3 and 4) having a paddle 11 positioned off center, as shown in the drawings, is used to minimize lump entanglement. In the dispersion kettle, the collagen slices are slowly stirred in the perfluoro acid solution. The collagen slices absorb the perfluoro acid solution with swelling.

Temperature becomes a critical factor after addition of acid to the tendon slices as the collagen is rapidly degraded in the presence of acids at about 30° C. and above. For this reason, all processing subsequent to the perfluoro acid addition must be carried out at temperatures of about 25° C. or below.

The swelling solution is an aqueous solution of a perfluoro acid having the formula $CF_3(CF_2)_nCOOH$ in which $n$ is zero or a whole integer smaller than five. While perfluoro acids having at least two but no more than six carbon atoms may be used in the practice of the present invention, perfluoro butyric acid is preferred. The protection against denaturation that is effected by the perfluoro acids varies with the length of the aliphatic acid chain. If there are fewer than four carbon atoms in the perfluoro acid, the addition compound formed with the collagen molecules is less resistant to degradation and if there are more than six carbon atoms in the perfluoro acid, the water solubility of the perfluoro acid is so decreased that swelling is seriously retarded. The amount of perfluoro acid present will vary with the equivalent weight of the acid and its ionization constant. In general, however, from about 0.20 percent to 1 percent of the total weight of the solution is used to obtain a pH in the range of 2–3.

It is very difficult to prepare a collagen dispersion containing more than 2 percent collagen as more concentrated dispersions have an extremely high viscosity. When the collagen dispersion is to be used in an extrusion process, the amount of tendon present in the swelling solution is preferably about 1 percent by weight. A dispersion of collagen fibers that has a solids constant below about 0.8 percent is difficult to spin. On the other hand, a concentration of collagen fibers greater than 1 percent results in a suspension that is more difficult to extrude. Of equal importance is the difficulty in obtaining and maintaining a homogeneous dispersion when the total solids are too high. It is extremely important that a collagen fiber disperson which is to be extruded be homogeneous, as a small change in the solids concentration of the material being extruded will result in large cross-sectional variations in the final product.

Figure 5:
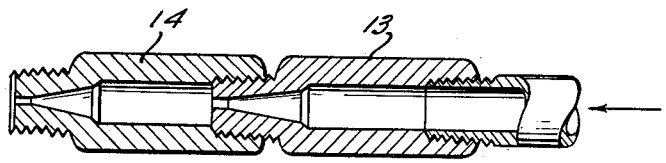
Figure 5 is a detailed sectional view of two homogenizing jets of the type that are used in the return line to the dispersion kettle.

After most of the swelling has taken place (two to four hours), the suspension is homogenized by repeated passes through a stainless steel rotary metering pump 12 and stainless steel series-connected jets 13 and 14 having orifices of about 50 mils and 40 mils, respectively. The internal structure of these jets is illustrated by Figure 5. It will be noted from Figure 3 that these jets are positioned in parallel banks. This readily permits isolating any pair of jets from the system for cleaning.

Stirring is continued during homogenization. Best results are obtained with a slow agitation (60 r.p.m.) during the swelling stage, intermittent agitation at the beginning of homogenization, and higher speed (120 r.p.m.) intermittent agitation near the end of the homogenization.

The homogenizing pump 12 employed in this process is a rotary pump that has been modified by milling about 0.003 inch from the circumference of the gear teeth. The intake and exit from the pump are connected to the dispersion kettle by the stainless steel conduit 15 which is capable of withstanding the high pressure.

The homogenizing pump is operated at 190 r.p.m. for two to four hours. The flow rate through the homogenizing jets at the start of this step is irregular and the pressure on the gauge 16 may rise above 200 pounds per square inch. Toward the end of the homogenization step, however, the pressure between the pump and the 50-mil jet 13 is relatively constant at 60 to 80 pounds per square inch.

The dispersion after homogenization still contains fibers of unswollen reticulin which must be removed. This is most readily accomplished by forcing the dispersion under pressure through a leaf filter which retains the reticulin.

Figure 6:
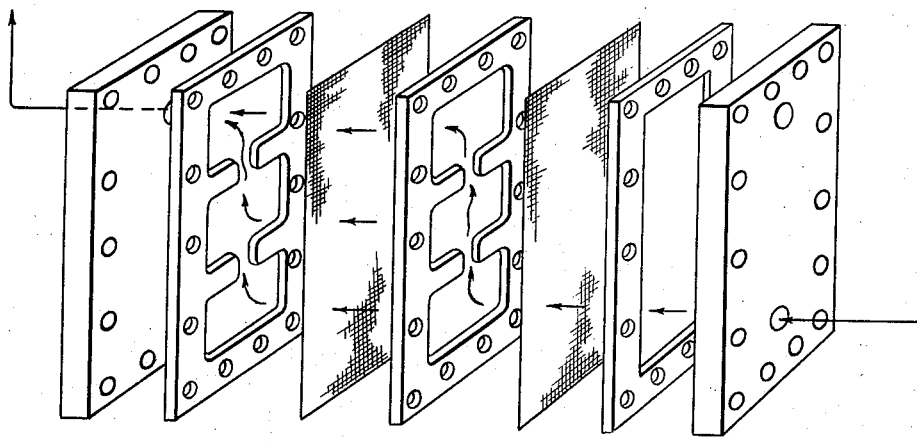
Figure 6 is an exploded view of a screen filter.

Figure 6 is an exploded view of a leaf filter which may be expanded to include any desired number of screens. A suitable filter may contain three of more screens of #316 stainless steel. These screens are separated by ⅛-inch spacers and decrease in mesh size so that the swollen collagen first passes a 15-mil screen, then a 9-mil screen and finally a 4-mil screen. During the filtration step, the speed of the pump may be varied as necessary to maintain the pressure on the filter below about forty pounds per square inch at all times. Pressures above fifty pounds per square inch may force the reticulin into the filtered dispersion.

The dispersion of collagen fibers after filtration may be deaerated under vacuum and is then ready for storage. If stored at 5° C. or below, the dispersion will remain substantially unchanged for periods in excess of two weeks.

In the examples which follow all quantities are expressed in parts by weight.

*Example 1*

The "D" section (deep flexor) of cattle is cleaned of fat, protein, and other extraneous matter and is sliced on an electric meat-slicing machine (rotary knife) in the frozen condition. The tendon sections are sliced perpendicularly to their longitudinal axis to a thickness of about 25 mils. An aliquot sample of the tendon slices is analyzed for total solids.

The sliced tendon is next treated with an enzyme solution to dissolve elastin. The enzyme solution is prepared by agitating 40 parts of malt diastase with 400 parts of water for ten minutes. The homogeneous suspension is centrifuged at 2000 r.p.m. for 20 minutes, and the clear aqueous solution from the centrifuging step is vacuum filtered through a "Celite" mat. "Celite" is an inert analytical filtering aid manufactured by The Johns-Mansville Company. The filtrate, which is usually slightly acid, is adjusted to pH 7 with a few drops of dilute sodium hydroxide. Distilled water is then added to this neutral enzyme solution to bring the total volume up to 1200 parts. Four hundred parts of the sliced tendon is immersed in this solution, which is then covered with a layer of toluene to prevent mold growth. This tendon-enzyme mixture is incubated at 37.5° C. overnight (15–20 hours).

After incubation, the tendon slices are washed three or four times by decantation with distilled water and then treated with 1000 parts of water containing four parts of "Versene" (ethylene diamine tetrasodium acetate). The tendon-"Versene" mixture is incubated for approximately two hours at 37.5° C. to remove soluble proteins and lipins. Following this "Versene" treatment, the pH should again be adjusted to 7 if necessary, as the tendon slices are easier to handle (less swelling and hydration) in a neutral solution. The tendon slices are again washed by decantation with five to six changes of distilled water.

The swelling solution is an 0.35 percent solution of perfluoro butyric acid in water. In general, the collagen dispersion is easy to process at about 1 percent solids concentration, and the amount of acid-swelling solution may be readily calculated from the weight and solids content of the tendon used. For example, since the tendon slices employed in making up the present suspension analyzed 33 percent solids (67% moisture), the total weight of collagen and reticulin present is approximately 400 parts×33%=132 parts. In calculating the amount of tendon required to make up a suspension of known concentration, the weight of tendon solids (on a dry basis must be multiplied by the factor 1.1 in order to correct for the reticulin present in the tendon. Reticulin is not swollen by the acid solution and must be removed from the suspension. The total weight of a 1 percent suspension from 132 parts of tendon would be therefore be $$132 \text{ parts} \times \frac{100\%}{1.1\%} = 12{,}000 \text{ parts}$$

Due to the water content of the tendon, which at this stage of the process has a wet weight of 2145, 9855 parts of water are to be added. To this amount of water is added 42 parts of perfluoro butyric acid (1200 parts×0.35%).

The aqueous acid solution is cooled to below 25° C. and is added to a dispersion kettle as illustrated in Figure 3, and the processed collagen slices are added to the dispersion kettle while rotating the stirrer at about 60 r.p.m. It is important that the remaining steps in the process be carried out at temperatures below about 25° C. and that the temperature of the collagen dispersion not be allowed to exceed this temperature. An irreversible change in the viscosity of the collagen dispersion takes place at about 34° C.

Stirring is continued for 3 hours during which time the individual collagen slices are swollen. The suspension is then homogenized by repeated passes through the stainless steel rotary metering pump 12, described above, and the stainless steel series-connected jets (13 and 14) having orifices of 50 mils and 40 mils, respectively. During the homogenization, the stirrer in the dispersion kettle is operated intermittently.

The pressure on the high pressure side of the homogenization jets falls to 70 pounds per square inch and remains constant after 3.5 hours, indicating substantially complete homogenization. The dispersion is then forced through a leaf filter containing three screens of #316 stainless steel. These screens are separated by ⅛-inch spacers and decrease in mesh size so that the dispersion first passes a 14-mil screen, then a 9-mil screen, and finally a 4-mil screen. During the filtration step, the pressure on the filter is maintained below about 40 pounds per square inch at all times.

The dispersion of solvated collagen fibers after filtration weighed approximately 11,000 parts (0.9% solids). Six hundred parts of material is held up in the filter. The dispersion is an opaque, thixotropic mass which, at room temperature, assumes a very viscous, slowly flowable state. Perfluoro acid dispersions prepared by the method outlined above are characterized by a relative low viscosity and flow properties that are superior to dispersions prepared with other organic (hydrocarbon) acids.

Figure 7:
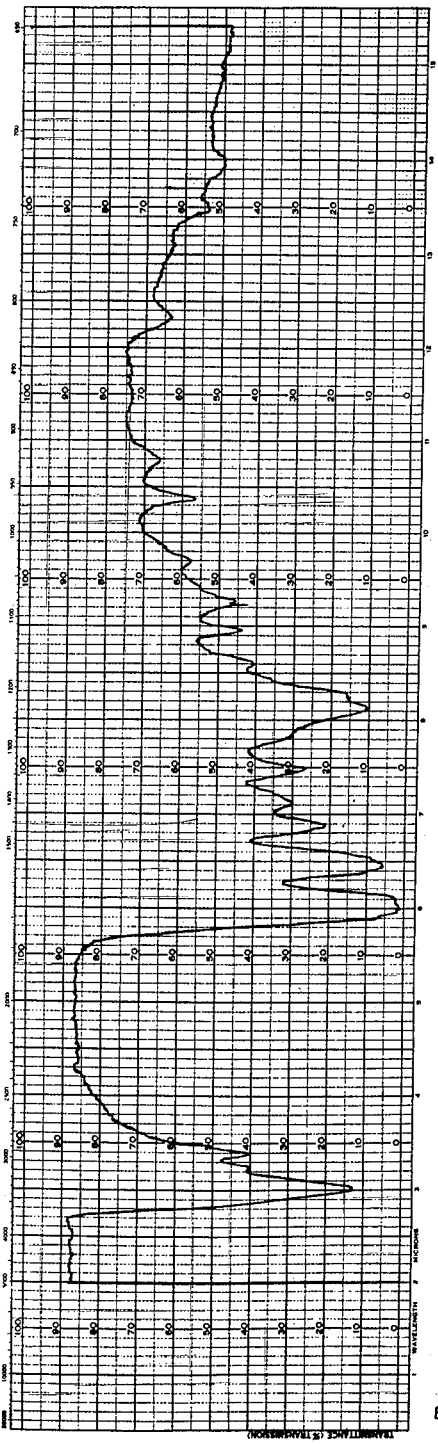
Figure 7 is the infra-red spectrum of a film cast from a perfluoro acid dispersion of collagen.

A characteristic infra-red spectrum of a perfluoro butyric acid dispersion is obtained by casting a thin film and determining the transmittance of the air-dried film with a Perkin-Elmer infra-red recording spectrophotometer. The infra-red spectrum is reproduced in Figure 7.

The dispersion of Example I may be dehydrated under mild conditions to recover highly purified collagen fibers or may be extruded to form collagen filaments, edible sausage casings and other shaped articles of exceptional strength.

Example II

One hundred parts of sliced beef tendon (the deep flexor tendon) is swollen in 2000 parts of 0.3 percent aqueous per fluoro hexanoic acid. The swollen slices are dispersed by mechanical agitation and the dispersion so obtained is diluted with about 16,000 parts distilled water. This diluted solution is centrifuged to remove associated impurities and the supernatant liquid is separated and neutralized to a pH of 7.0 with aqueous ammonia. About 50 parts of white collagen fibers precipitate, upon additon of the ammonia. Fibers obtained in this manner may be as much as four or five inches in length.

A second portion of 100 parts of collagen slices is swollen in 2000 parts of 0.3 percent aqueous acetic acid. The swollen slices are dispersed and the dispersion is diluted with distilled water as described above. Again, the diluted solution is centrifuged to remove associated impurities and the supernatant liquid is separated and neutralized to a pH of 7.0 with aqueous ammonia. The collagen fibers precipitating from the acetic acid dispersion were shorter in length (about two or three inches) and less white in color. Fiber precipitation from the perfluoro hexanoic acid dispersion may be accomplished by dilution to 20 times the dispersion volume with distilled water. Neutralization with alkali is necessary to precipitate collagen from the acetic acid dispersion.

Example III

A collagen dispersion is made from beef tendon (the deep flexor tendon) as described by swelling the sliced sections in 20 times their weight of an 0.2 percent aqueous perfluoro acid solution, and dispersing the swollen slices with a high speed mixer. The dispersion is diluted with distilled water as described in Example II, clarified in a centrifuge, and collagen fibers are precipitated by neutralization in aqueous ammonia to a pH of 7.0. The pure collagen fibers are separated by filtration and made into an aqueous dispersion with 0.35 percent perfluoro butyric acid. The collagen content of the dispersion is 1.8 percent by weight.

An equal quantity of sliced beef tendon is swollen in 20 times its weight of 0.2 percent aqueous acetic acid and is dispersed, diluted, centrifuged and precipitated in a manner that is identical with that described above. The pure collagen fibers are made into an aqueous dispersion with 0.3 percent malonic acid.

Extrusion of the two dispersions as multifilaments under the same conditions, produced strands with the following characteristics:

| Acid | Mg. Wt. 10 ft. | Ave. Dia., Mils | Tensile Strength in Pounds | | |
|---|---|---|---|---|---|
| | | | Dry Straight | Wet Straight | Dry Knot |
| Perfluoro butyric | 193 | 8.0 | 3.5 | 0.5 | 1.9 |
| Malonic | 246 | 12.5 | 2.7 | 0.0 | 1.6 |

The higher strength and smaller diameter of the perfluoro-treated material are both significant. The diameter decrease was caused by a higher stretch permitted by the greater plasticity and strength of the perfluoro-treated dispersion. Equal stretch could not be obtained with the malonic acid dispersion.

Example IV

The protective action of the perfluoro acids may be observed in following the course of degradation in a collagen dispersion. A dispersion, if prepared according to the process described in Example III with malonic acid, will form strands of maximum strength 24 hours after preparation if stored at 5° C. Thereafter, the strength of the strands will decrease as the collagen is degraded on standing. A dispersion, if prepared according to the process described in Example III with perfluoro butyric acid, will spin strands of maximum strength after several days' aging, and will continue to spin strands of equal strength after periods of more than three weeks aging at 5° C.

| Acid | Dispersion Age | Ave. Dia. Mils | Tensile Strength in Pounds | | |
|---|---|---|---|---|---|
| | | | Dry Straight | Wet Straight | Dry Knot |
| Malonic | 1 day | 12.5 | 3.4 | 0.0 | 1.7 |
| | 1 week | 11.0 | 2.5 | 0.0 | 1.5 |
| | 2 weeks | 10.5 | 1.9 | 0.0 | 1.5 |
| Perfluoro butyric | 1 day | 10.0 | 2.0 | 0.0 | 1.8 |
| | 5 days | 10.5 | 3.4 | 0.5 | 1.8 |
| | 8 days | 10.0 | 4.1 | 0.5 | 2.0 |
| | 14 days | 11.0 | 3.8 | 0.5 | 1.8 |
| | 21 days | 11.5 | 2.7 | 0.5 | 1.7 |

The invention herein described differs from such as embody the production of collagen dispersions in this respect, that it consists of dispersing collagen fibers that are neither denatured nor degraded in aqueous perfluoro acids. It is an advantage of the dispersion of this invention that it may be used to produce shaped articles of outstanding tensile strength. The mechanical spinning of collagen dispersions to form a suture material is described and claimed in co-pending application Serial No. 695,760, filed November 12, 1957, now abandoned and Serial No. 768,969, filed October 22, 1958, being a later filed case.

While the invention has been described in detail according to the preferred manner of carrying out the process and yielding the products, it will be obvious to those skilled in the art, after understanding the invention, that changes and modifications may be made therein without departing from the spirit or scope of the invention, and it is intended in the appended claims to cover all such alterations and modifications.

What is claimed is:

1. A dispersion of swollen collagen fibers in a dispersant consisting essentially of an aqueous solution of a perfluoro acid having the formula $CF_3(CF_2)_n COOH$, in which $n$ is a whole integer smaller than 5.

2. A dispersion of swollen collagen fibers in a dispersant consisting essentially of an aqueous solution of perfluoro butyric acid having the formula $CF_3(CF_2)_2 COOH$.

3. A dispersion of swollen collagen fibers in a dispersant consisting essentially of an aqueous solution of perfluoro butyric acid, said perfluoro butyric acid amounting to between 0.2% and 1.0% by weight of the total dispersion.

4. In a process for the extrusion of a collagen dispersion to form a shaped article, the improvement which comprises swelling and dispersing collagen fibers derived from animal tendons in an aqueous solution of a perfluoro acid having the formula $CF_3(CF_2)_n COOH$, in which $n$ is a whole integer smaller than 5.

5. In a process for the extrusion of a collagen dispersion to form a shaped article, the improvement which comprises swelling and dispersing collagen fibers in an aqueous solution of a perfluoro acid having the formula $CF_3(CF_2)_n COOH$, in which $n$ is a whole integer smaller than 5 while maintaining the temperature below about 25° C.

References Cited in the file of this patent

UNITED STATES PATENTS

| | | |
|---|---|---|
| 2,103,163 | Lange | Dec. 21, 1937 |
| 2,477,768 | Remer | Aug. 2, 1949 |
| 2,622,036 | Alexander et al. | Dec. 16, 1952 |